United States Patent [19]

Denq et al.

[11] Patent Number: 5,003,574
[45] Date of Patent: Mar. 26, 1991

[54] VOICE CAPTURE SYSTEM

[75] Inventors: Dong L. Denq, Pickerington, Ohio; Linda M. Mattson, Campbell, Calif.; Robert J. Perdue, Pickerington; Eugene L. Rissanen, Westerville, both of Ohio

[73] Assignee: AT&T Bell Laboratories, Murray Hill, N.J.

[21] Appl. No.: 330,570

[22] Filed: Mar. 30, 1989

[51] Int. Cl.⁵ ............................................. H04M 1/65
[52] U.S. Cl. ...................................... 379/75; 369/29; 379/84; 379/88
[58] Field of Search ........................ 379/75, 84, 67, 88, 379/214; 369/25-29; 381/41-44

[56] References Cited

U.S. PATENT DOCUMENTS

| | | | |
|---|---|---|---|
| 3,987,252 | 10/1976 | Vicari | 379/214 |
| 4,071,698 | 1/1978 | Barger, Jr. et al. | 379/84 |
| 4,338,494 | 7/1982 | Theis | 369/29 X |
| 4,627,001 | 12/1986 | Stapleford et al. | 369/29 X |

OTHER PUBLICATIONS

Grubb, *Dictation System*, IBM Technical Disclosure Bulletin vol. 22, No. 4, Sep. 1979, pp. 1327–1328.

*Primary Examiner*—David Trafton
*Assistant Examiner*—James E. Tomassini
*Attorney, Agent, or Firm*—Dwight A. Marshall

[57] ABSTRACT

A voice capture system for use with a telephone switching system and transcribing terminals to record calling party generated information in predefined formats. The system digitizes and records messages generated by calling parties served by the telephone switching system and records recognized terminology occurring within the calling party voice messages as file records. The transcribing terminals are enabled to display the file record terminology in predefined formats and the recorded digitized calling party messages are transmitted as audio messages via a telephone coupled with the telephone switching system to operators of the transcribing terminals so that the operators may enter information contained within the recorded messages into the transcribing terminals to complete the predefined format that are subsequently recorded in the voice capture system.

13 Claims, 5 Drawing Sheets

VOICE CAPTURE SYSTEM

TECHNICAL FIELD

This invention relates to communication systems and in particular to a voice capture system.

BACKGROUND OF THE INVENTION

In today's communication networks, it is possible for a customer to use a telephone and call a business concern to place an order for merchandise and services that are offered for sale by the business concern. Many large businesses and mailorder companies have transcribing positions that are connected by telephone lines with telephone switching offices of the public communication network. The transcribing positions are staffed by operators who answer incoming telephone calls and transcribe the customer orders onto order formats.

The number of orders oftentimes vary with respect to the time of day, the week day and with respect to the time of year. For example, more orders may be received in mid-morning and mid-afternoon hours and less orders received during early and late afternoon hours. Similarly, more telephone orders may be received on mid-week days than on a Monday or Saturday. More orders may also be received during the holidays or during various seasons of the year. A problem arises in that the number of operators required to staff the transcribing positions and the number of transcribing positions varies with respect to the number of orders received. More operators and transcribing positions may be required on mid-week days but are idle on other days. If insufficient operators or transcribing positions are available, orders may be lost thereby resulting in lost sales to the business concerns. Another problem arises with respect to small business concerns in that they not be able to hire operators or install transcribing positions for the relative short time that large numbers of telephone orders are received.

SUMMARY OF THE INVENTION

The foregoing problems are solved and communication systems may be substantially enhanced by a voice capture system and method of operating a voice capture system intended for use with a telephone switching system and transcribing terminals to record calling party generated information in predefined formats. The system digitizes and records messages generated by calling parties served by the telephone switching system and records recognized audio terminology within the calling party voice messages as file records. The transcribing terminals are enabled to display the file record terminology in predefined formats and the recorded digitized voice messages are transmitted as audio messages via a telephone coupled with the telephone switching system to operators of the transcribing terminals so that the operators may enter information contained within the recorded audio messages into the transcribing terminals to complete the predefined formats that are subsequently recorded in the voice capture system.

In accordance with a preferred embodiment of the invention, the voice capture system comprises line circuits and trunk circuits for interconnecting the voice capture system with corresponding line and trunk circuits of the telephone switching system. Voice response units generate audio voice prompt messages to instruct calling parties in the use of the voice capture system and voice record units receive voice messages generated by the calling parties in response to the voice prompt messages and recognize terminology in the received voice messages. An analog switch selectively interconnects the voice response and record units with the line circuits and trunk circuits.

Modem units interconnect the voice capture system with the transcribing terminals and with ones of the telephone switching system line and trunk circuits. A disk store stores the calling parties' recognized terminology and voice messages. A first data bus interconnects the analog switch, voice record and response units and the line and trunk circuits and a second data bus interconnects the modems and disk store.

A processor unit interconnected with the first and second data buses controls the analog switch to interconnect voice response and record units with the line and trunk circuits interconnected with calling parties. The processor unit digitizes and records the received calling party voice messages and records the recognized terminology as file records in the disk store. Transcribing terminals coupled with the modems are enabled by the processor unit to display the recorded terminology in predefined formats. The voice capture system transmits the recorded digitized voice messages as audio messages via the line and trunk circuits and the telephone switching system to operators of the transcribing terminals so that information contained therein may be entered into the transcribing terminals to complete the predefined formats for recording in the disk store.

DETAILED DESCRIPTION

Figure 1:
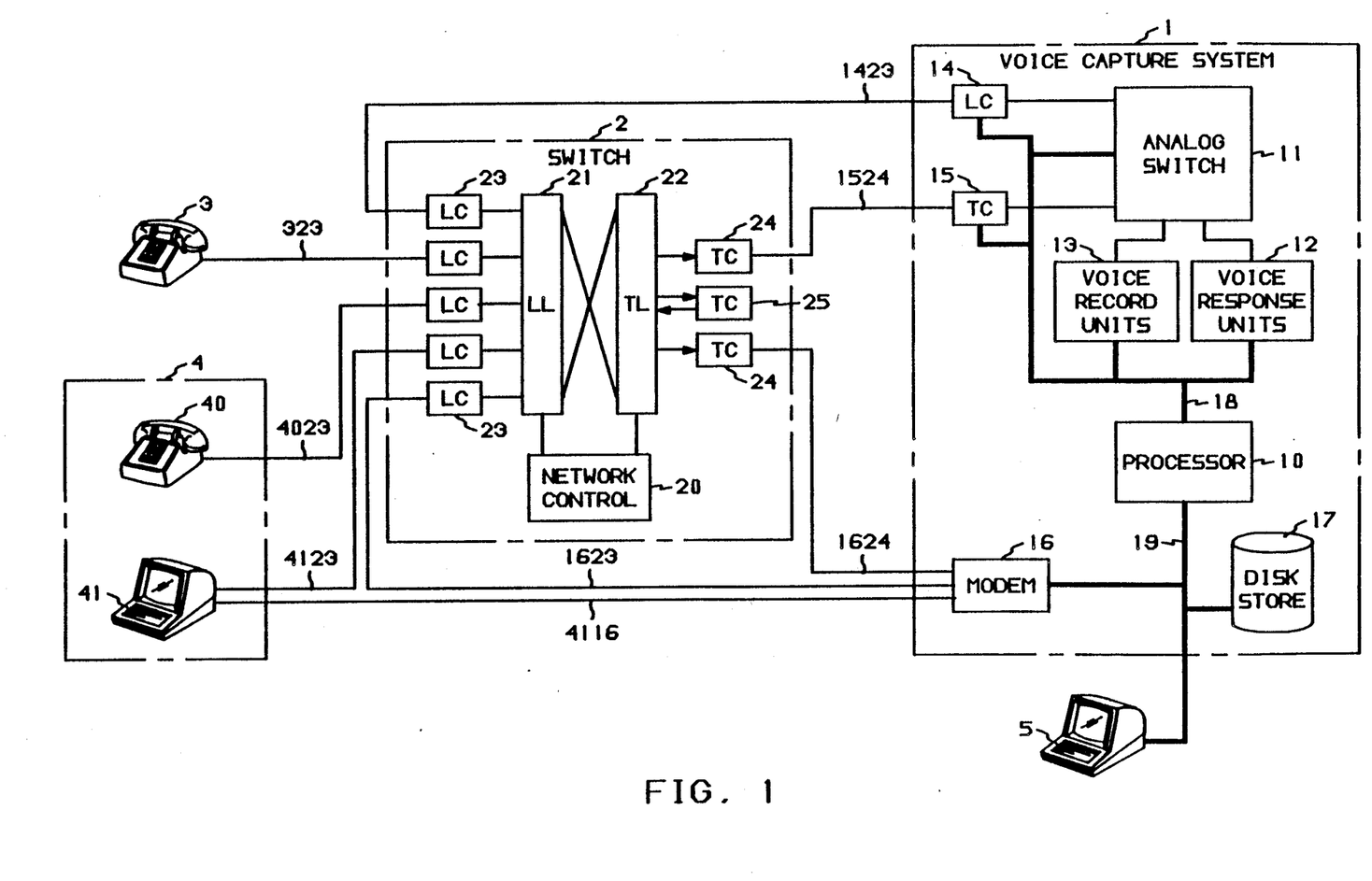
FIG. 1 illustrates a voice capture system embodying the principles of the instant invention.

Switch 2, FIG. 1, may be any one of a number of well known types of telephone switching systems such as an AT&T 5ESS ® electronic switching system wherein program controlled network control 20 responds to calling party dialed commands by selectively interconnecting line equipment 21 with trunk equipment 22 to couple calling parties 3 and 40 with line circuits 23 and trunk circuits 24 interconnected with voice capture system 1. Such telephone switching systems are well known and need not be described in detail for an understanding of the invention.

Ones of switch 2 line circuits 23 are connected by telephone lines 323 with customers hereinafter referred to as calling parties 3. Other switch 2 line circuits 23 are coupled by telephone lines 4023, 4123 with operator telephones 40 of transcribing terminals 41 at transcribing positions 4. Switch 2 line circuits 23 are also connected by telephone lines 1423, 1623, respectively, with line circuits 14 and modems 16 of voice capture system 1. Similarly, switch 2 trunk circuits 24 are connected by trunk lines 1524, 1624 with trunk circuits 15 and modems 16, respectively, of voice capture system 1.

Transcribing terminals 41 of transcribing positions 4 may also be connected by private lines 4116 with voice capture system modems 16.

Depending on operation of network control 20, calling party 3 may be connected by telephone line 323, line circuit 23, trunk circuit 24 and trunk line 1524 with trunk circuit 15 of voice capture system 1. In another operation of switch 2, calling party 3 may be connected by telephone line 323, line circuit 23, intraoffice trunk circuit 25, another line circuit 23 and telephone line 1423 with voice capture system line circuit 14. Calling parties 3 served by another telephone switching system, not shown, may be connected with voice capture system 1 over a path consisting of switch 2 trunk circuits such as trunk circuits 24, line or other trunk circuits 23, 24, telephone and trunk lines 1423, 1524, respectively, with voice capture system line and trunk circuits 14 and 15.

Operator telephone 40 may be connected by telephone line 4023, line circuit 23, trunk circuit 24 and trunk line 1524 with trunk circuit 15 of voice capture system 1. In addition, operator telephone 40 may be connected by telephone line 4023, line circuit 23, intraoffice trunk circuit 25, another line circuit 23 and telephone line 1423 with voice capture system line circuit 14. Operator telephones 40 may also be served by other telephone switching systems, not shown, similar to switch 2 and connected with voice capture system 1 over a path consisting of switch 2 trunk circuits such as trunk circuits 24, line or other trunk circuits 23, 24, telephone and trunk lines 1423, 1524, respectively, with voice capture system line and trunk circuits 14 and 15. Transcribing terminals 41 may be connected in a likewise manner with voice capture system 1 over telephone line 4123 via line and trunk circuits 23, 24 and telephone lines and trunk lines 1623, 1624 of switch 2 with modem 16.

Voice capture system 1 has a number of line circuits 14 and trunk circuits 15 each coupled with a corresponding line circuit 23 and trunk circuit 24 of switch 2. Each voice capture system line and trunk circuit 14, 15 is also coupled to analog switch 11 and controlled by a first bus 18 extending from processor unit 10. A number of voice response units 12 are each connected with analog switch 11 and controlled via processor unit 10 and bus 18 to generate audio prompt messages which are used to instruct calling parties 3 interconnected with line and trunk circuits 14, 15 in the use of voice capture system 1 and to request specific information and terminology from calling parties 3. In addition, each voice response unit 12 is controlled by processor unit 10 to transmit messages, previously received from calling parties 3 in response to the generated audio prompt messages and stored in disk store 17, to operator telephones 40, via appropriate line and trunk circuits 14, 15, switch 2 and telephone lines 4023.

Voice capture system 1 is also provided with voice record units 13 each interconnected with analog switch 11 and controlled by processor unit 10 via bus 18. Each voice record unit 13 receives messages generated by calling parties 3 in response to the generated audio prompt messages. Each received calling party message is digitized and recorded under control of processor unit 10 in disk store 17. Voice record units 13 are also controlled by processor unit 10 to recognize terminology predefined by the subscribers for services offered by voice capture system 1 and previously stored in disk store 17. Terminology as used herein consists of calling party spoken or keyed alphanumeric phrases that have been predefined to identify materials and services being offered for sale. Analog switch 11 interconnected with line circuits 14, trunk circuits 15, and with voice response units 12 and voice record units 13 are controlled by processor unit 10 via bus 18 to selectively connect ones of voice response and record units 12, 13 with ones of line and trunks circuits 14, 15 connected with calling parties 3 and operator telephones 40.

Voice capture system 1 also has modem units 16 for interconnecting voice capture system 1 with transcribing terminals 41 via private lines 4116 and with telephone lines 4123 coupled with transcribing terminals 14 via line and trunk circuits 23, 24 of switch 2 over telephone line and trunk lines 1623, 1624. Each modem unit 16 is coupled with a second data bus 19 and controlled by processor unit 10 in the well known manner to convert digital signals on bus 19 into analog signals for transmission on lines 1623, 1624 and 4116 and analog signals on lines 1623, 1624 and 4116 into digital signals for transmission on bus 19. Disk store 17, which may be any well known disk or tape apparatus having large storage capacity for digital information, is connected to bus 19 and is controlled by processor unit 10 to store information received by voice capture system 1.

Processor unit 10 may be a computer, such as AT&T 3B2-400 and 3B2-310 simplex or duplex computers. Such computers, FIG. 2, need not be described in detail for an understanding of the invention and in general have a central processing unit 100 and a memory unit 101 each interconnected by address, data and control leads to a pair of buses 18, 19. Bus 18, interconnected with line and trunk circuits 14, 15, analog switch 11 and voice response and record units 12, 13, enables processor unit 10 to control each unit and to exchange information therewith in the operation of voice capture system 1. Bus 19 is interconnected with modem units 16 and with disk store 17 so that information exchanged with transcribing terminals 41 may be stored in and retrieved from disk store 17. Computer terminal 5, which may be any of a number of well known computer terminals or personal computers, is coupled with bus 19 and serves to maintain voice capture system 1.

Figure 2:
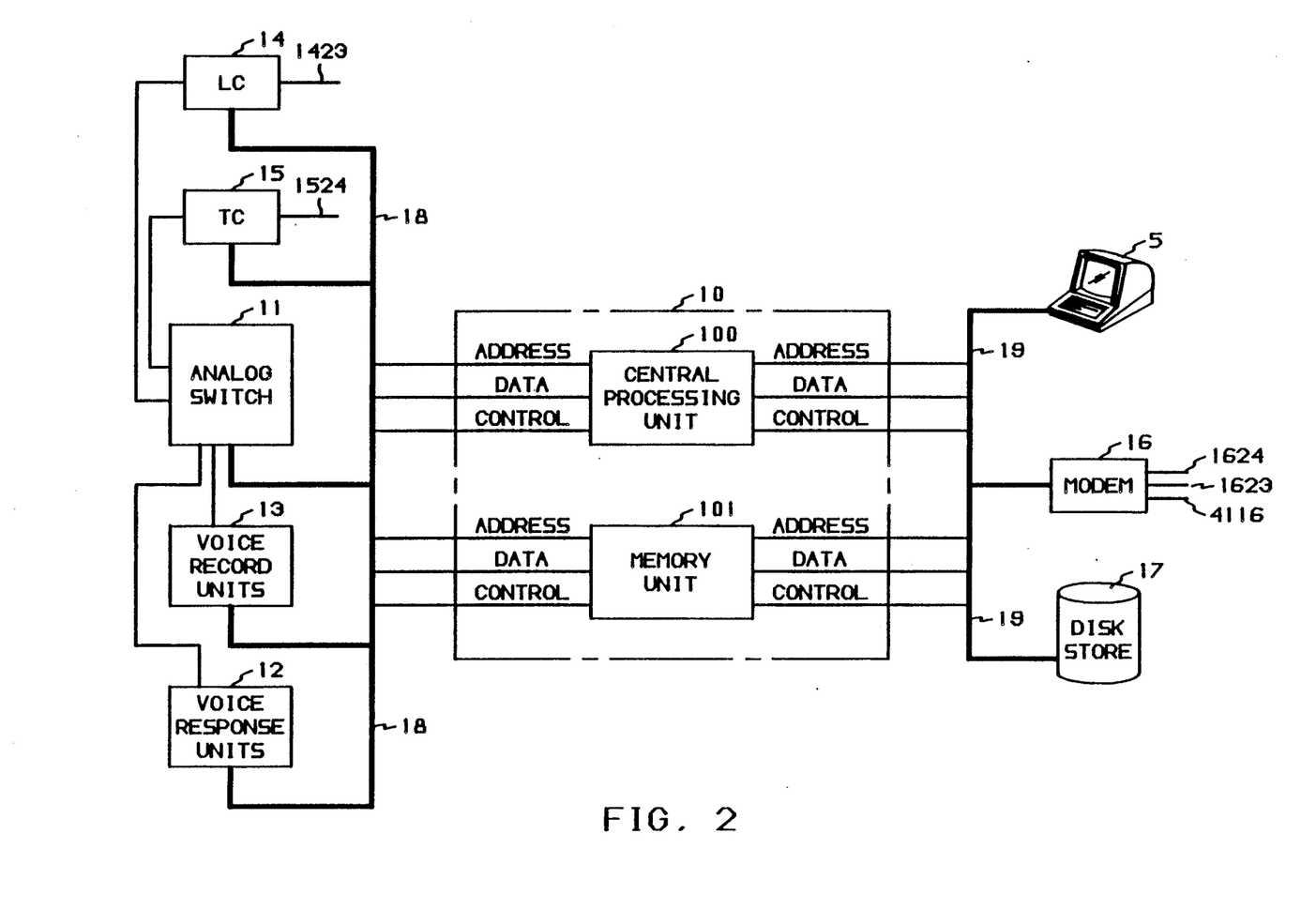
FIG. 2 sets forth the functional relationship of the voice capture system apparatus set forth in FIG. 1.

Processor unit 10 may be controlled by computer terminal 5 to store terminology defined by subscribers of voice capture system 1 in disk store 17. Such subscribers may be various business concerns such as department stores that offer a large variety of merchandise to customers who may place orders by telephone and who are herein referred to as calling parties 3. Such terminology consists of alphanumeric phrases predefined by the business concern subscribers to identify specific merchandise and services that are offered for sale to calling parties 3.

In addition to terminology, processor unit 10 is also programmed to store a number of digital messages in disk store 17 that are used to prompt calling parties 3, FIG. 1, in the use of voice capture system 1 and to enter various information and terminology that are required to identify the appropriate business concern and ordered merchandise and services. Typically, such digital prompt messages may be "What company are you calling?" and "Would you please state in the following order your name, address, city, state, zip code, and telephone number.". Other digital prompt messages stored in disk store 17 may be requests for credit information such as "What credit card will you be using?" and "What is the number and expiration date of the credit card?'. In addition, other digital prompt messages such as "Please give the item number and quantity of each item" for the merchandise and services to be ordered.

Disk store 17 of voice capture system 1 records calling party information by storing both digitized received calling party messages and recognized terminology as file records each assigned specifically to subscribers of voice capture system 1. When transcribing terminal 41 is logged onto voice capture system 1 and connected via private line 4116 or telephone line 4123 and switch 2 with modem 16, processor unit 10 controls disk store 17 to transmit the terminology stored in the appropriate file records to transcribing terminal 41. Transcribing terminal 41 displays the recognized terminology, FIG. 3, in partially completed predefined formats 410 as illustrated by screen display of transcribing terminal 41.

Operators of transcribing terminals 41, FIG. 1, place telephone 40 in an off-hook state and dial a predefined telephone number over telephone line 4023 to establish connections via switch 2 with voice capture system 1. Processor unit 10 responds to incoming calls from operators of transcriber positions 4 by controlling analog switch 11 to establish connections between appropriate line and trunk circuits 14, 15 and ones of voice response units 12. Previously digitized and recorded messages of calling parties 3 stored in disk store 17 and associated with file records assigned transcribing position 4 are then transmitted as audio voice messages from voice response units 12 connected with line or trunk units 14, 15 through switch 2 and over telephone line 4023 to operator telephones 40.

Figure 3:
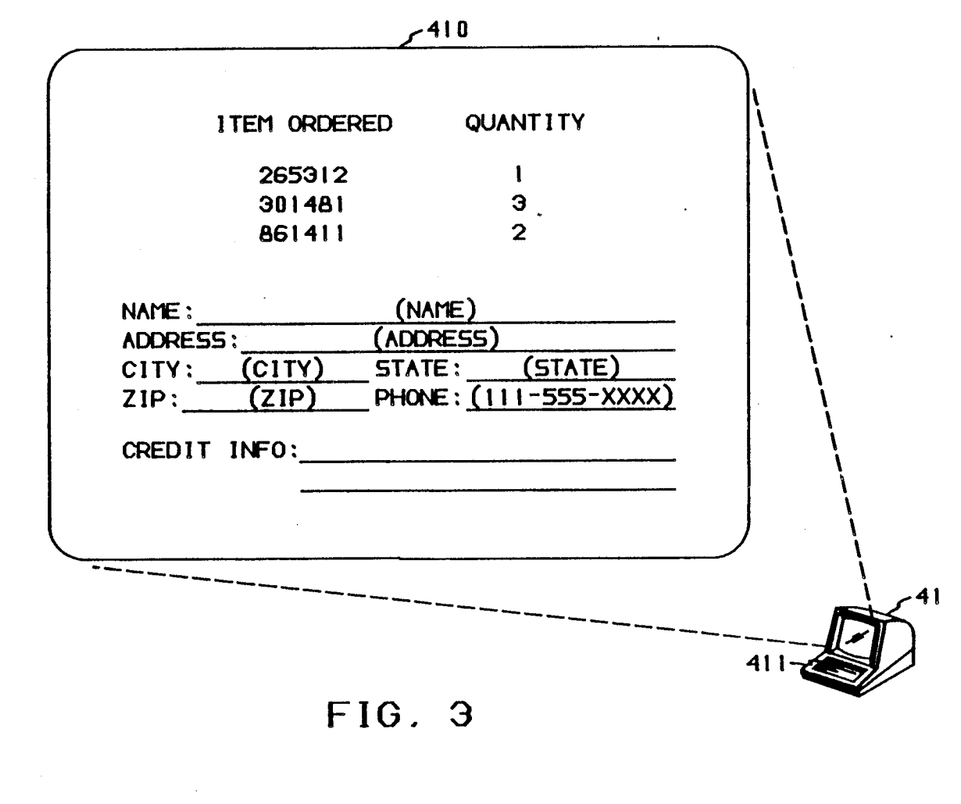
FIG. 3 illustrates a typical screen format presentation appearing on transcribing terminal 41 set forth in FIG. 1.
Figure 4:
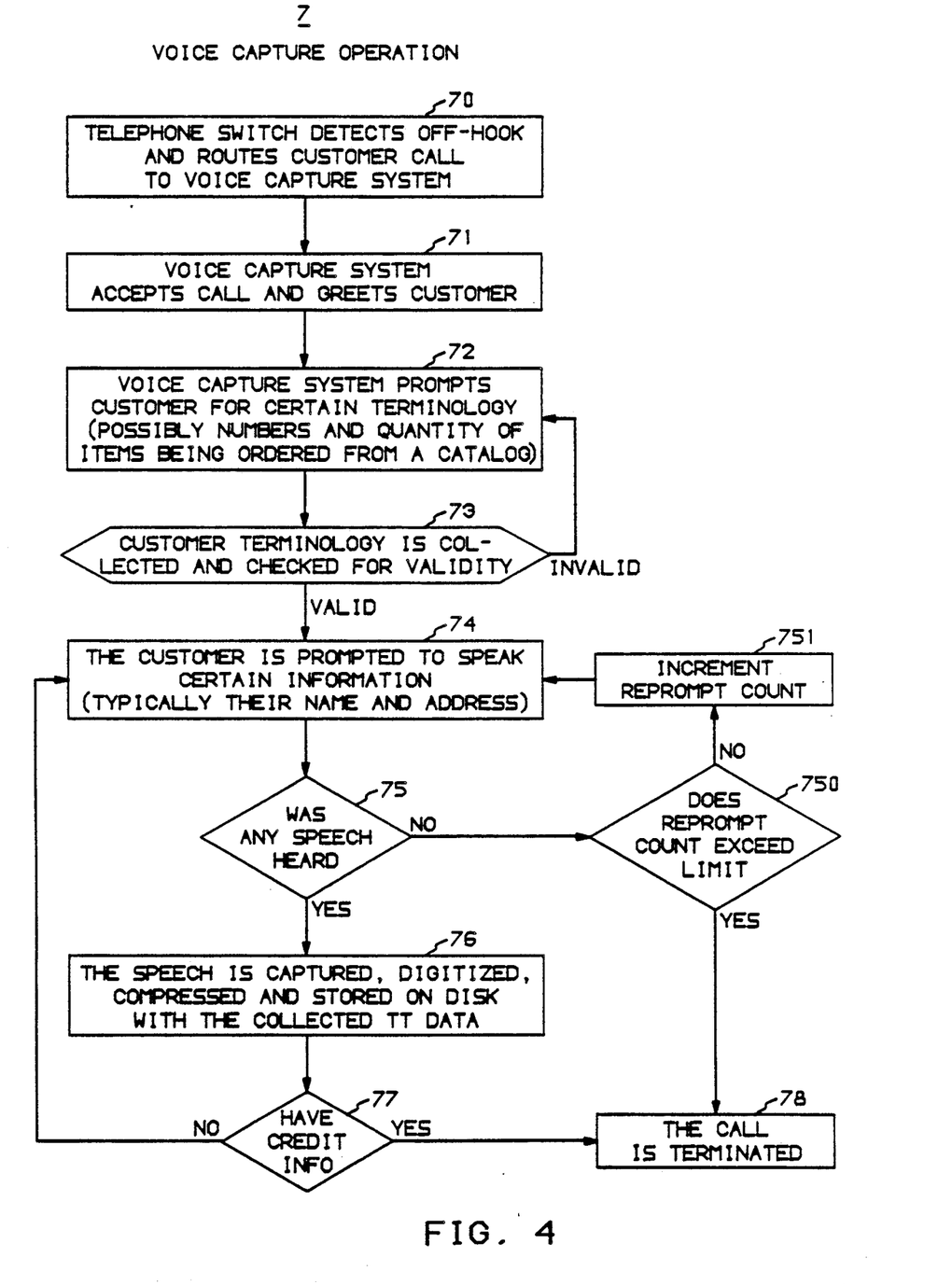
FIGS. 4 and 5 illustrates flow charts of the operation of the voice capture system set forth in FIGS. 1 and 2 in accordance with the principles of the invention.
Figure 5:
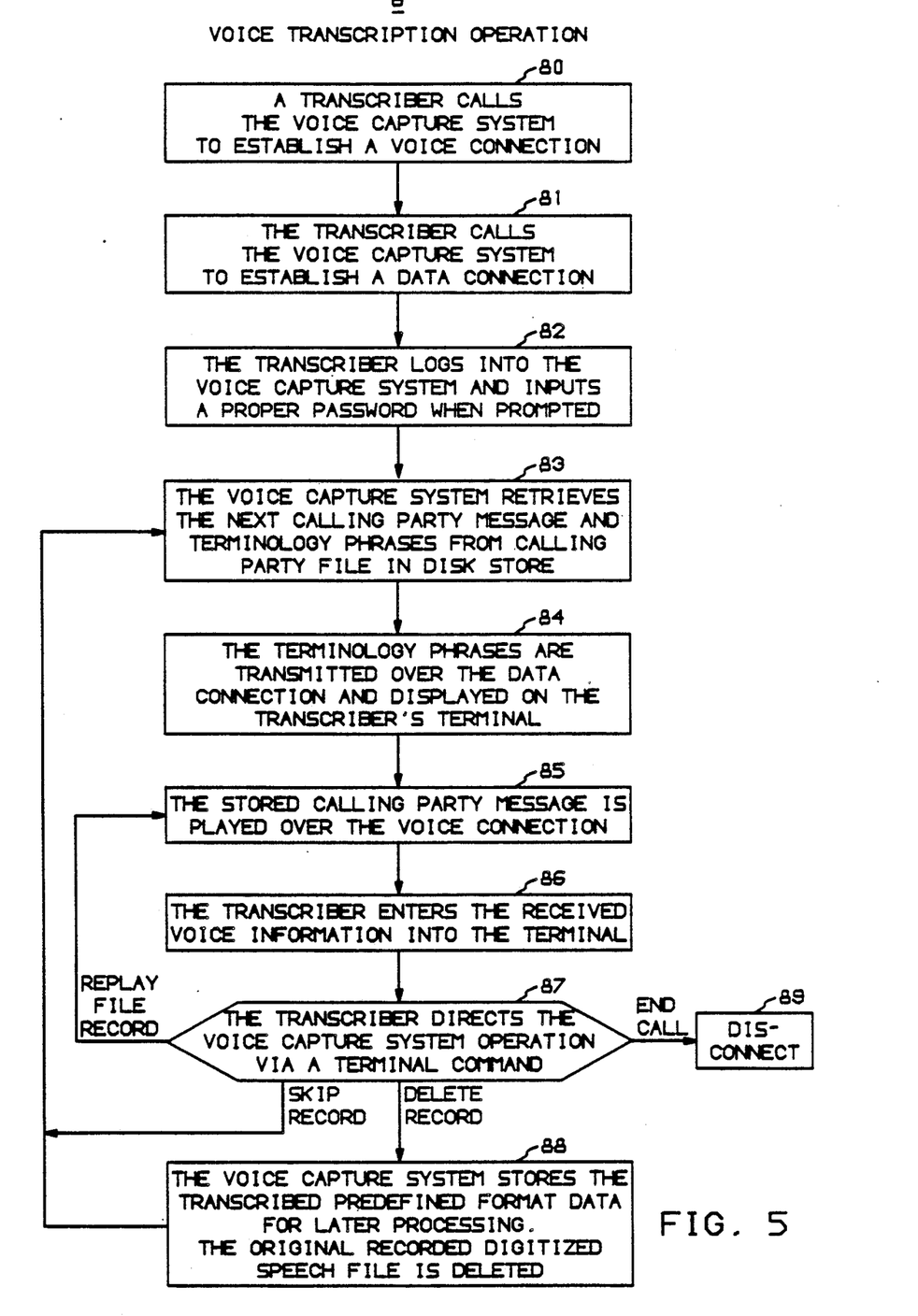

Transcribing terminals 41, coupled via private and telephone lines 1623, 4123 with modems 16, display a partially completed predefined format 410, FIG. 3, wherein the recognized terminology may be displayed as alphanumeric symbols such as 265312, 301481 and 861411 representing the type and quantity of material and services ordered by a calling party 3. Other calling party information such as customer name, address, city, state, zip code, phone and credit information is still required to complete predefined format 410. Operators, receiving the audio messages previously recorded by voice capture system 1, FIG. 1, over telephone line 4023 and telephone 40, transcribe the calling party information by entering the received calling party name, address, city, state, zip code and telephone number, FIG. 3, via keyboard 411 into transcribing terminal 41. Similarly, credit information of calling party 3 received over telephone 40 is entered by the operator into transcribing terminal 41 to complete predefined format 410. Upon completion, FIG. 1, the completed predefined format 410 is recorded in disk store 17 as a customer order which may be accessed by the appropriate subscriber of voice capture system 1 to complete a sales transaction.

In the operation of voice capture system 1, FIGS. 7, 8, switch 2 detects an off-hook state, step 70, of a calling party telephone line 323, FIG. 1, coupled with telephone 3 and returns dial tone to calling party 3. Calling party 3, intending to place an order for material or services offered by a department store having subscribed to the transcription service offered by voice capture system 1, dials the telephone number assigned the department store for this service. Switch 2 responds to the off-hook state and the dialed digits by establishing a connection from line circuit 23 through line link 21 to trunk link 22. Network control 20, depending upon programmed instructions, may establish a call connection to voice capture system 1 via trunk circuit 24 over trunk line 1524 to trunk circuit 15 or via intraoffice trunk circuit 25, trunk and line links 22, 21, line circuit 23 and telephone line 1423 with line circuit 14.

Line and trunk circuits 14, 15, FIG. 7, step 71, notify processor unit 10, via bus 18, of the presence of the incoming call and processor unit 10 responds to the incoming call notification by controlling analog switch 11 to establish a voice connection between the appropriate line and trunk link 14, 15, FIG. 1, with an idle voice response unit 12. After the establishment of the voice connection, processor unit 10 reads a digital prompt message previously stored in digit store 17 over bus 19 and transmits the digital prompt message over bus 18 to voice reponse unit 12. The digital prompt message may be a message such as "Thank you for calling Department Store. Would you please place your order by keying or speaking the number and quantity of each item you wish to order into the telephone." that is generated by voice response unit 12 as a voice prompt message, step 72, and transmitted via switch 2 and the appropriate telephone lines and trunks to calling party 3.

Calling party 3 responds to the received voice prompt message by either speaking or keying terminology phrases such as the number identifying the items and services and the quantity into telephone 3. The calling party message containing the terminology phrases is received by the line or trunk circuit 14, 15 coupled with calling party 3 and transmitted to a voice record unit 13 via analog switch 11. Voice record unit 13 under control of processor unit 10, FIG. 7, step 73, recognizes the calling party terminology phrases occurring in the received message and collects and checks the terminology phrases for validity. The terminology phrases are digitized and transmitted over bus 18 to processor unit 10. If the recognized terminology is valid information of the department store subscriber, processor unit 10 establishes a calling party file record in a location of disk store 17 assigned to the department store subscriber and stores the recognized terminology therein. When processor unit 10 determines that the terminology in the received calling party message is invalid, step 73, voice response unit 12 is controlled over bus 18 to prompt calling party 3 to repeat the order information.

After the terminology phrases have been verified, processor unit 10, step 74, retrieves a digital prompt message such as "Would you please state in the following order your name, address, city, state, zip code, and telephone number" from disk store 17, FIG. 2, and sends the digital prompt message via buses 19 and 18 to the appropriate voice response unit 12. Voice response unit 12 generates a voice prompt message, FIG. 7, step 74, from the received digital prompt message and transmits it via analog switch 11, FIG. 1, line or trunk circuit 14, 15 and switch 2 to calling party 3. When calling party 3 responds with the requested information, step 75, voice record units 13 of voice capture system 1 digitizes the received calling party message and notifies processor unit 10 of the receipt of the message. Processor unit 10, step 76, records the digitized name and address information and stores it in a compressed format as a part of the calling party file record previously established in disk store 17. If calling party 3 fails to respond to a transmitted voice prompt message, step 75, processor unit 10 determines if a reprompt count has been exceeded, step 750. If the current value of the reprompt count is less than the limit, the reprompt count is incremented by 1, step 751, and steps 74 and 75 are repeated. Should the reprompt count exceed the limit, step 750, the call is terminated, step 78, and processor unit 10 initiates a sequence to disconnect voice capture system 1 from the call connection.

Following receipt and storage of the calling party order, name and address information, processor unit 10, step 76, determines if the calling party credit information has been received, step 77. If the credit information has not been received, processor unit 10 retrieves digital prompt messages such as "What credit card will you be using?" and "What is the number and expiration date of the credit card?" from disk store 17 and controls voice response unit 12, FIG. 1, to transmit voice credit prompt messages to calling party 3. Processor unit 10 repeats steps 74 through 77, 750, and 751 until the calling party credit information is received, digitized and captured by being stored in disk store 17 in the compressed format as a part of the previously established calling party file record. Once the calling party order, name, address and credit information has been captured and stored in disk store 17 the call is terminated, step 78, and a sequence initiated to disconnect calling party 3 from voice capture system 1.

A subscriber, such as the aforementioned department store, to voice capture system 1, FIG. 1, and herein referred to as transcribing position 4, has transcribing terminals 41 that may be coupled to voice capture system 1 by private line 4116 or to switch 2 by telephone line 4123. An operator hereinafter called transcriber, places telephone 40 in an off-hook state and dials a secure telephone number to enable switch 2 to establish a voice call connection with voice capture system 1, FIG. 8, step 80. Processor unit 10, FIG. 1, responds to the incoming call of a secure line or trunk circuit 14, 15 by controlling analog switch 11 to connect a voice record unit 13 with the appropriate line or trunk circuit 14, 15.

The transcriber, positioned at transcribing terminal 41 which is connected via telephone line 4123 with switch 2, FIG. 8, step 81, also initiates a data call to voice capture system 1 by entering another secure telephone number into transcribing terminal 41. Switch 2, FIG. 1, depending on the operation of network control 20, establishes a data connection from line circuit 23 through line and trunk links 21, 22 and trunk circuit 24 and trunk line 1624 or via intraoffice trunk 25, line circuit 23 and telephone line 1623 with modem 16 of voice capture system 1. Upon receiving a prompt message from voice capture system 1, FIG. 8, step 82, the transcriber enters a login and password into transcribing terminal 41 and is connected with voice capture system 1 under control of processor unit 10.

Processor unit 10, step 83, retrieves the recorded digitized calling party message and associated terminology phrases of the first calling party file record assigned the calling voice capture system subscriber from disk store 17. The retrieved file record terminology phrases, step 84, is read into modem 16, FIG. 1, and transmitted over the data connection either via private line 4116 or by trunks and lines 1624, 1623, switch 2 and telephone line 4023 to transcribing terminal 41. Transcribing terminal 41 displays the received terminology phrases in a partially completed predefined format 410, FIG. 3, wherein the identity and quantity of the calling party previously ordered items appear before the transcriber.

The digitized calling party message, FIG. 8, step 85, is read into the voice record unit 13, FIG. 1, connected with transcriber station telephone 40 and transmitted via the appropriate line or trunk circuit 14, 15, switch 2 and telephone line 4023 to telephone 40. Name, address, city, state, zip code, telephone number and credit information contained in the received and previously recorded calling party voice message, FIG. 8, step 86, is entered by the transcriber into keyboard 411, FIG. 3, of transcriber terminal 41 to complete the predefined format 410.

The transcriber, FIG. 8, step 87, may direct the operation of voice capture system 1 to replay the calling party file record by repeating steps 85, 86, 87 to either check the received information or to repeat information that may have missed in the original transmission. In another operation, the transcriber may wish to skip a particular file record and continue to the next calling party file record by repeating steps 83 through 87. Once the predefined format 410, FIG. 3, has been completed using the previously recorded calling party information, FIG. 8, step 87, the transcriber deletes the current file record from the transcribing terminal 41 and commands voice capture system 1 to store the completed predefined format data, step 88, in disk store 17, FIG. 1, as a customer order for subsequent processing by the voice capture system subscriber. Processor unit 10 deletes the recorded calling party digitized voice message from disk store 17 and continues the transcribing sequence, FIG. 8, for other calling parties by repeating steps 83 through 87. After all calling party file records have been completed, voice capture system 1, step 89, ends the transcribing session by initiating a sequence to disconnect transcriber terminal 41, FIG. 1, and telephone 40 from voice capture system 1.

It is obvious from the foregoing that the facility, economy and efficiency of the telephone network may be substantially enhanced by a voice capture system. While the instant invention has been disclosed with a voice capture system coupled by lines and trunks with a telephone switch, it is to be understood that such an embodiment is intended to be illustrative of the principles of the invention and that numerous other arrangements such as having the voice capture system included as an integral component of a telephone switch may be devised by those skilled in the art without departing from the spirit and scope of the invention.

We claim:

1. A voice capture system for use with a telephone switching system and transcribing terminals to record calling party generated information in predefined formats wherein said voice capture system comprises means interconnected with the telephone switching system and the transcribing terminals for digitizing and recording messages generated by calling parties served by the telephone switching system and for recognizing predefined terminology within the calling party voice messages and recording said recognized predefined terminology as file records and responsive to ones of the transcribing terminals coupled therewith for enabling said transcribing terminals to display said recorded recognized predefined terminology in partially completed predefined formats and transmitting said recorded digitized voice messages as voice messages via a telephone coupled with the telephone switching system to operators of the transcribing terminals for entering information contained in said transmitted messages into the transcribing terminals to complete said predefined format recorded in said voice capture system.

2. The voice capture system set forth in claim 1 wherein said means comprises a plurality of line circuits and trunk circuits for interconnecting said voice capture system with corresponding line and trunk circuits of the telephone switching system.

3. The voice capture system set forth in claim 2 wherein said means comprises a plurality of voice response units for generating voice prompt messages to instruct calling parties interconnected with ones of said voice capture system line and trunk circuits in use of the voice capture system.

4. The voice capture system set forth in claim 3 wherein said means comprises a plurality of voice record units for receiving voice messages generated by the calling parties in response to the generated voice prompt messages and recognizing said predefined terminology occurring in said received messages.

5. The voice capture system set forth in claim 4 wherein said means comprises an analog switch interconnected with said voice capture system line and trunk circuits and with said voice response and record units for selectively connecting ones of the voice response and record units with ones of said voice capture system line circuits and trunk circuits.

6. The voice capture system set forth in claim 5 wherein said means comprises a plurality of modem units for interconnecting said voice capture system with the transcribing terminals and with ones of said telephone switching system line and trunk circuits.

7. The voice capture system set forth in claim 6 wherein said means comprises a disk store for storing said calling party voice messages and for storing said recognized predefined terminology in ones of said file records assigned the calling parties.

8. The voice capture system set forth in claim 7 wherein said means comprises a pair of data buses for interconnecting said analog switch, disk store, modems, voice record and response units and said voice capture system line and trunk circuits.

9. The voice capture system set forth in claim 6 wherein said means comprises a processor unit interconnected with a pair of data buses to control said analog switch to interconnect said voice response and record units with ones of said voice capture system line and trunk circuits interconnected with calling parties coupled with the telephone switching system for digitizing and recording said received calling party messages and for recording said recognized predefined terminology as file records in a disk store and responsive to transcribing terminals coupled with said modems for transmitting said recognized predefined terminology in said file records to said transcribing terminals to enable said transcribing terminals to display said recognized predefined terminology in partially completed predefined formats and for transmitting said recorded digitized voice messages as audio messages via ones of said voice capture system line and trunk circuits and a telephone to operators of the transcribing terminals for enabling said operators to enter information contained therein into the transcribing terminals to complete said partially completed predefined format for recording said completed predefined format in said disk store.

10. The voice capture system set forth in claim 9 wherein said processor unit comprises means for translating said recognized predefined terminology into predefined information and recording said predefined information into ones of the file records for subsequent transmission to specific ones of the transcribing terminals.

11. A voice capture system for use with a telephone switching system and transcribing terminals to record calling party generated information in predefined formats wherein said voice capture system comprises means interconnecting the voice capture system with line and trunk circuits of the telephone switching system for generating prompt messages to instruct calling parties coupled with ones of the telephone switching system line and trunk circuits in use of the voice capture system and for recognizing predefined terminology within messages generated by calling parties in response to the prompt messages, and means controlling said generating and recognizing means for digitizing and recording said received calling party messages and for recording said recognized predefined terminology as file records and responsive to the transcribing terminals coupled with the voice capture system for transmitting said file records to the transcribing terminals and enabling the transcribing terminals to display said recognized predefined terminology in partially completed ones of the predefined formats and for transmitting said recorded digitized voice messages as audio messages via ones of said telephone switching system line and trunk circuits to operators of the transcribing terminals for enabling the operators to enter information contained within the transmitted audio messages into the transcribing terminals to complete said predefined formats.

12. A voice capture system for use with a telephone switching system and transcribing terminals wherein said voice capture system comprises a plurality of line circuits and trunk circuits for interconnecting said voice capture system with corresponding line and trunk circuits of the telephone switching system, a plurality of voice response units for generating voice prompt messages to instruct calling parties in use of the voice capture system, a plurality of voice record units for receiving voice messages generated by the calling parties in response to the generated voice prompt messages and recognizing predefined terminology phrases within said received voice messages, an analog switch for selectively interconnecting ones of the voice response and record units with ones of the voice capture system line circuits and trunk circuits, a plurality of modem units for interconnecting said voice capture system with the transcribing terminals and with ones of said telephone switching system line and trunk circuits, a disk store for storing ones of the calling parties recognized predefined terminology phrases and recorded voice messages, a first data bus for interconnecting said analog switch, voice record and response units and voice capture system line and trunk circuits, a second data bus for interconnecting said modems and disk store, and a processor unit interconnected with said first and second data buses to control said analog switch to interconnect said voice response and record units with ones of said voice capture system line and trunk circuits interconnected with calling parties for digitizing and recording said received calling party voice messages and for recording said recognized predefined terminology phrases as file records in said disk store and responsive to transcribing terminals coupled with said modems for enabling said transcribing terminals to display ones of said recognized predefined terminology phrases in partially completed predefined formats and transmitting said recorded digitized voice messages as audio messages via ones of said voice capture system line and trunk circuits and a telephone to operators of the transcribing terminals for entering information contained within the audio messages into the transcribing terminals to complete said partially completed predefined format for recording in said disk store.

13. A method for operating a voice capture system interconnected with line and trunk circuits of a telephone switching system and with transcribing terminals wherein the method of operating the voice capture system comprises the steps of generating voice prompt messages to instruct calling parties coupled with ones of the telephone switching system line and trunk circuits interconnected with the voice capture system in use of the voice capture system and recognizing predefined terminology phrases in messages received from the calling parties in response to the voice prompt messages, digitizing and recording said received calling party messages and recording said recognized predefined terminology phrases as file records, and transmitting said file records to ones of the transcribing terminals to enable the transcribing terminals to display said recognized predefined terminology phrases recorded in said file records in partially completed predefined formats and said recorded digitized calling party messages as audio messages via ones of said telephone switching system line and trunk circuits to operators of the transcribing terminals for enabling the operators to enter information contained within the transmitted audio messages into the transcribing terminals to complete said partially completed predefined formats and to store the completed predefined formats within the voice capture system as customer orders.

* * * * *